United States Patent [19]

Carley

[11] Patent Number: 4,524,662
[45] Date of Patent: Jun. 25, 1985

[54] STRAIGHT-CUT GUIDE FOR SAWS

[76] Inventor: Rickey L. Carley, 787 Riverside Dr., Ukiah, Calif. 95482

[21] Appl. No.: 467,199

[22] Filed: Feb. 17, 1983

[51] Int. Cl.³ .............................................. B27B 9/04
[52] U.S. Cl. ...................................... 83/745; 269/208
[58] Field of Search ...................... 83/745; 269/1, 208; 33/446, 443

[56] References Cited

U.S. PATENT DOCUMENTS

| 307,439 | 11/1884 | Corbett | 269/208 X |
|---|---|---|---|
| 488,546 | 12/1892 | Doddrell | 269/208 X |
| 926,030 | 6/1909 | Stout | 269/208 X |
| 974,240 | 11/1910 | Darr | 269/208 |
| 1,145,199 | 7/1915 | Kobert | 269/208 X |
| 2,796,097 | 6/1957 | Garner | 269/208 X |
| 4,179,965 | 12/1979 | Johnson | 83/745 |
| 4,202,233 | 5/1980 | Larson | 83/745 |

FOREIGN PATENT DOCUMENTS

| 983676 | 6/1951 | France | 269/208 |
|---|---|---|---|
| 735365 | 8/1955 | United Kingdom | 269/208 |

Primary Examiner—James M. Meister
Attorney, Agent, or Firm—Flehr, Hohbach, Test, Albritton & Herbert

[57] ABSTRACT

The present invention is a simple, inexpensive and lightweight straight-cut saw guide comprising a rigid structural guide member with a number of holes along its axis, a screw driven holding clamp which is attached at one end of the guide member and provides an abutment for engaging one end of the work piece, and a stop clamp with an abutment for engaging the other end of the work piece. The stop clamp is inserted through any one of the holes in the guide member at varying distances from the holding clamp depending upon the size of the work piece to be held and cut. The screw driven holding clamp serves to clamp the saw guide onto the work piece after the abutment is in place.

2 Claims, 2 Drawing Figures

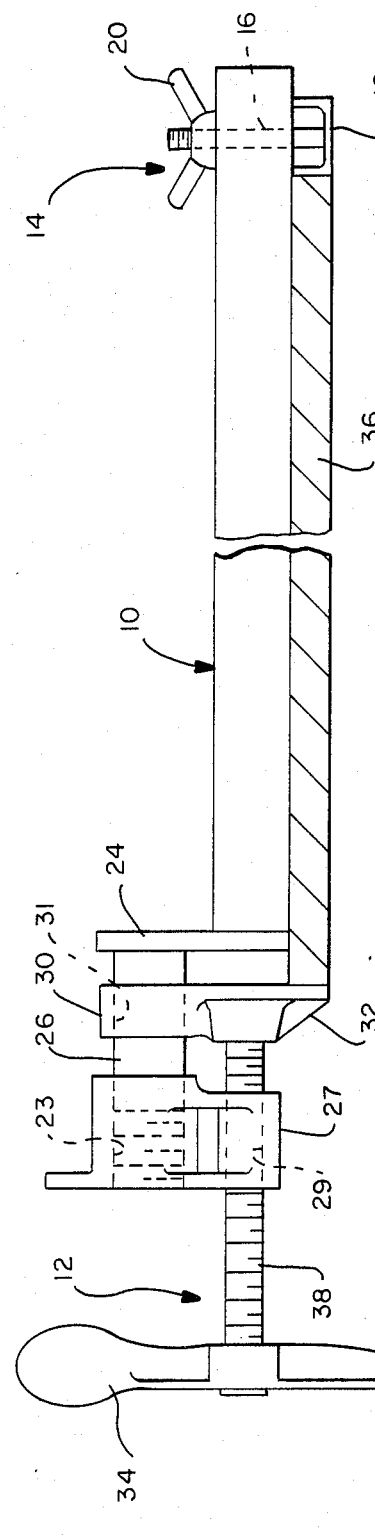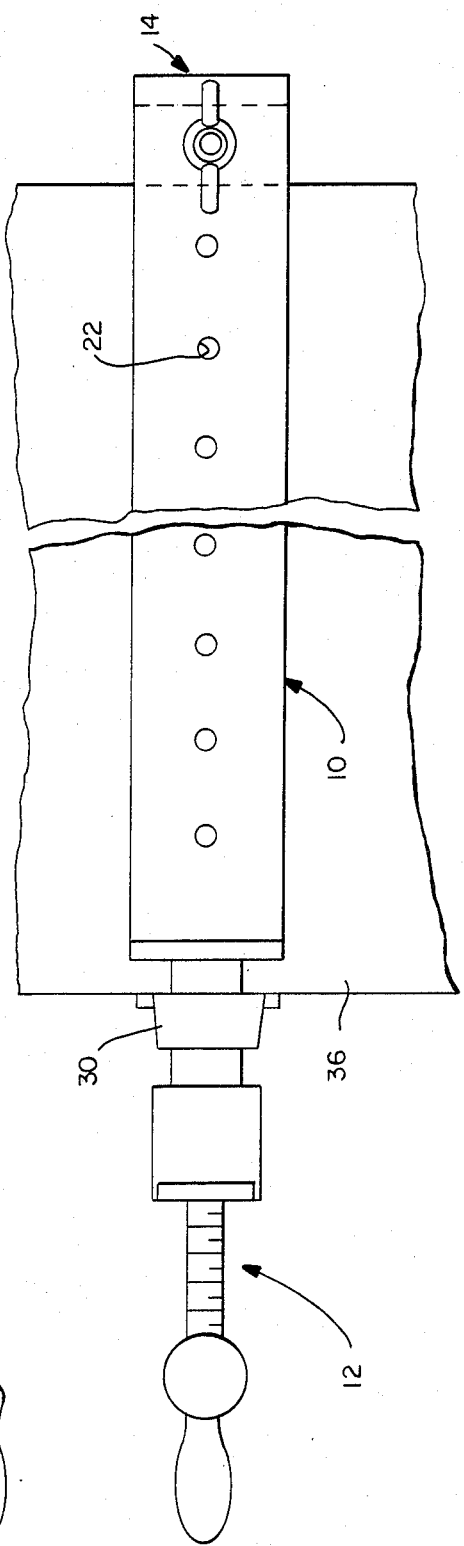

STRAIGHT-CUT GUIDE FOR SAWS

The present invention relates to a novel, useful and inexpensive saw guide adapted to clamp onto and overlie a work piece providing a parallel guiding edge for cutting purposes.

The primary purpose of the present invention is to provide a low cost, easy to use, and easy to manufacture saw guide. The appropriate prior art in this area discloses saw guides which are marvels of complexity. U.S. Pat. No. 3,287,803 discloses a power saw guide having a swinging arm which establishes a fixed offset distance from a main guide bar. This offset is the distance between the side guard of the saw and the saw blade. The major portion of Fortune's claims are devoted to the various designs of these swing arms. U.S. Pat. No. 2,773,523 discloses a power saw guide with two arms, one arm clamps the guide to the work piece and another arm connected to the first serves as the cutting guide. Both patents disclose guides exceedingly more complex in design and more difficult to use than the present invention.

U.S. Pat. No. 2,002,676 discloses a stone cutting guide which has a slideable locking jaw at one end and a spring driven clamp at the other. This guide is used to provide a base line for a stone mason to use in cutting stone. The screw driven clamp in the present invention provides for easier and more rapid engagement and disengagement from the work piece.

U.S. Pat. Nos. 2,942,633 and 4,202,223 disclose power saw guides in which the saw is disposed on a carriage which rides on a steel beam. The present invention does not require such a carriage and indeed the use of such a carriage with the present invention would substantially increase the complexity of it. U.S. Pat. No. 4,077,292 discloses a similar concept. This patent attaches a guiding system to the power saw which allows the saw to glide along the surface of either an "L" or "I" supporting transverse beam.

U.S. Pat. No. 4,179,965 discloses a power saw guide comprising an offset guage for correcting the distance between the saw blade and its side guard, and a threaded bar having a clamping means at both ends. This patent seems to be primarily concerned with offset distances as opposed to the present invention which is concerned primarily with providing a simple and easy guiding system.

The major concern of the above cited prior art seems to be to provide an offset mechanism which takes into account the distance between the guiding edge of the saw guide and the actual blade. The present invention is designed to simplify the complex mechanical devices which are currently available. Rather than concerning ourselves with swing arms, carriages, and supporting transverse beams, the present invention discloses a simple, inexpensive, and adaptable saw guide.

Accordingly, the primary object of the present invention is to provide a saw guide which is easy to use and easy and inexpensive to manufacture.

A further object of the present invention is to provide for a light weight saw guide which may be rapidly attached to and disengaged from a piece of wood or other material. Another object of the present invention is to provide for a saw guide which may be firmly attached to a piece of wood or other material.

A further object of the present invention is to provide for a saw guide that may be used with any type of power saw.

In general, the present invention constitutes a rigid structural guide member to which is attached a screw driven clamp at one end and a stop clamp at the opposite end for securing and holding the saw guide in place on the work piece. The stop clamp may be placed in various positions along the length of the guide member in order to accomodate different sized work pieces by removing the stop clamp and securing it onto the guide member at provided holes.

The screw driven holding clamp is a commercially available pipe clamp. The guide member is provided with a welded flange perpendicular to the body of the guide member to which in turn is welded a segment of threaded pipe. The screw driven holding clamp consists of a guide ring which is slipped onto the pipe and a screw threaded attaching ring which is screwed onto the end of the pipe after the guide ring is in place. The guide ring has a depending flange which provides an abutment to be placed against the work piece and screwed into position by a screw threaded driver, which is also a part of the holding clamp.

Other objects and features of the invention will be evident from the following description taken in conjunction with the accompanying drawings.

FIG. 1 is a side plan view of the present invention showing details of the screw driven holding clamp, and the stop clamp.

FIG. 2 is a top plan view of the present invention.

Referring to FIG. 1, the saw guide of the present invention is comprised of three elements, a rigid structural guide member 10, a screw driven clamp 12, and a stop clamp 14. The guide member is preferably rectangular in shape, open ended, and made of a lightweight metal. To make a cut, the saw guide is attached to the work piece by means of the screw driven clamp and stop clamp, as described below, and a saw is run parallel to the long axis of the guide, keeping the saw guide in contact with the guide member.

At one end of the structural guide member, opposite the stop clamp 14, a vertical flange 24 is provided to which is attached a screw threaded pipe 26. Preferably this vertical flange is welded onto the guide member and in turn, the screw threaded pipe is welded onto the flange. Preferably, the vertical flange 24 is coplanar with the bottom of the guide member 10 so as not to interfere with the clamping action of the screw driven holding clamp.

A screw driven holding clamp 12 is attached to the rectangular guide member by first inserting the guide ring 30 over the pipe and then screwing the attaching ring 27 onto the screw threaded pipe 26. The guide ring comprises an unthreaded circular segment which includes an opening 31 to loosely accommodate the screw threaded pipe and a depending flange 32 which provides abutment means for engaging the work piece.

The threaded attaching ring 27 is provided with two threaded openings 28 and 19. One of these threaded openings 28 attaches the holding clamp onto the guide member by screwing the attaching ring onto the threaded pipe. Through the other threaded hole 29 of the attaching ring is disposed the screw threaded driver 38. This driver is attached at one end to the depending flange 32 of the guide ring 30 and is provided at its other end with a keyed handle 34. Upon rotating the handle 34, the screw threaded driver provides clamping pressure, which is applied to the work piece by the depending flange of the guide ring.

The maximum throw of the screw threaded holding clamp is determined by the distance between the attaching ring 27 and the vertical flange 24, or by the length of the screw threaded driver 38, whichever is smaller. At the other end of the guide member is disposed a stop clamp 14. The stop clamp preferably consists of an open ended rectangular abutment 18 whose long axis is disposed across the width of the guide member. The abutment serves to align one end of the work piece against the saw guide. The stop clamp is preferably attached to the guide member by means of a securing bolt 16 which is attached at the unthreaded end to the rectangular abutment and at the threaded end to the guide member by means of a nut 20. In the preferred embodiment of the present invention, the securing bolt 16 is welded to rectangular stop 18 and a butterfly nut 20 is used to secure the stop clamp to the structural guide member.

Referring to FIG. 2, a series of holes 22 are provided along the guide member 10. These holes allow the stop clamp 14 to be adjustably secured along the length of the guide member. The distance between these holes should be less than the maximum distance the depending flange 32 can be driven by the screw threaded driver 38, or in other words less than the maximum throw distance of the driver. This insures that the stop clamp can be placed directly against the edge of the work piece.

In use, the saw guide is placed over the work piece 36. The saw guide is attached to the work piece by moving the stop clamp 14 to a position which allows the depending flange 32 of the guide ring 30 to abut one end of the work piece when the opposite end of the work piece is engaged by the stop clamp abutment. The screw threaded holding clamp 12 is then tightened onto the work piece so that the saw guide is firmly attached thereto.

The simplicity in use of the present invention arises because of its no-frills design. Since the users of the present invention are able to measure the offset distance from the edge of the saw guide of their own power saws to the cutting edge of the saw blade, they merely take into account that distance when measuring off a score line for cutting the piece of wood, or whatever material they wish to cut. They may then easily and rapidly attach the saw guide of the present invention along that line and proceed to make their cut. The prior art inventions would require the craftsman to attach the saw guide, establish an offset distance, provide a score line which would take into account that offset distance, and then swing away the offsetting device before a cut could be made.

The present invention allows the craftsman, whether he be an amateur or a professional, to simply measure off the distance, attach the saw guide of the present invention, and then proceed to make the cut.

The multitude of uses to which the present invention could be put are obvious. The present invention may be used as a guide for cutting wood, concrete, steel or other construction materials. The length of the guide member 10 may be anywhere from a few inches to six feet or longer, depending upon application. Various sizes of pipe clamps or screw threaded holding clamps 12 are available on the market, and may be interchangeably used with the present invention. Similarly, available commercial units, whereby the vertical dimensions of the stop 18 or of the depending flange 32 of the guide ring 30 may be varied, may also be used for certain work applications. This diverse utility enhances the novelty and simplicity of the present invention.

What is claimed is:

1. A saw guide comprising:
   a. a rigid structural guide member having disposed at one end thereof a vertical flange with a threaded pipe section attached thereto, said guide member having a plurality of holes along the axis thereof;
   b. a screw driven holding clamp attached to said rectangular guide member for adjustably positioning said guide relative to one end of a work piece, said screw driven holding clamp comprising a guide ring having a depending flange which provides an abutment for engaging the end of said work piece, said guide ring being loosely accomodated around said screw threaded pipe section of said guide member, a screw threaded driver for clamping said depending flange against said work piece, said driver connected to said depending flange at one end and having a driving handle attached to the opposite end, and a threaded attaching ring for connecting said holding clamp to said guide member, said attaching ring having two spatially separated adjacent screw threaded openings, one of said threaded openings providing a passage for said screw threaded driver at an intermediate distance between said guide ring and said driving handle and the other said threaded opening being attached to said screw threaded pipe section of said guide member;
   c. a stop clamp providing a second abutment for engaging the opposite end of said work piece, said stop clamp being adjustably positioned along said guide member at varying distances from said holding clamp by selective positioning of securing means within said holes in the guide member thereby accommodating work pieces of different sizes.

2. A saw guide according to claim 1 wherein said stop clamp comprises a rectangular abutment and said securing means comprises a bolt insertable through any one of said holes in said guide member and secured thereto by means of a nut.

* * * * *